United States Patent
Nakamura

(10) Patent No.: US 10,527,848 B2
(45) Date of Patent: Jan. 7, 2020

(54) CONTROL DEVICE, CONTROL METHOD, AND PROGRAM

(71) Applicant: Sony Interactive Entertainment Inc., Tokyo (JP)

(72) Inventor: Yuichiro Nakamura, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 55 days.

(21) Appl. No.: 15/570,869

(22) PCT Filed: Jun. 3, 2016

(86) PCT No.: PCT/JP2016/066658
§ 371 (c)(1),
(2) Date: Oct. 31, 2017

(87) PCT Pub. No.: WO2016/199699
PCT Pub. Date: Dec. 15, 2016

(65) Prior Publication Data
US 2018/0164587 A1    Jun. 14, 2018

(30) Foreign Application Priority Data
Jun. 12, 2015    (JP) ................. 2015-119431

(51) Int. Cl.
*A61B 6/00*    (2006.01)
*H04L 29/06*    (2006.01)
(Continued)

(52) U.S. Cl.
CPC ........... *G02B 27/017* (2013.01); *G02B 27/02* (2013.01); *G06F 3/01* (2013.01); *G06F 3/011* (2013.01);
(Continued)

(58) Field of Classification Search
CPC ........ H04N 5/64; H04N 13/204; A61B 6/462; G02F 27/017-02; G06F 3/011; G06F 3/16; G06F 3/01; G09G 5/64
See application file for complete search history.

(56) References Cited

U.S. PATENT DOCUMENTS 6,426,740 B1 * 7/2002 Goto .................. A61F 4/00
345/157
9,197,840 B2    11/2015 Yamamoto
(Continued)

FOREIGN PATENT DOCUMENTS

CN    103064187 A    4/2013
CN    103430534 A    12/2013
(Continued)

OTHER PUBLICATIONS

Yamagishi et al., "Head-mounted display, biological information Management Apparatus, and Biological Information Display Method", Dec. 2015, JP2013-258555A Machine Translation.*
(Continued)

*Primary Examiner* — Lin Li
(74) *Attorney, Agent, or Firm* — Matthew B. Dernier, Esq.

(57) ABSTRACT

Embodiments provide a suitable viewing environment, in accordance with whether a head-mounted display is mounted or detached. A control device includes a state identification unit configured to identify whether a head-mounted display is mounted or detached, and an output control unit configured to control, in accordance with the mounting or the detachment, at least one of sound output and video output from a display device provided separately from the head-mounted display.

5 Claims, 9 Drawing Sheets

(51) Int. Cl.
- *G02B 27/01* (2006.01)
- *H04N 5/64* (2006.01)
- *G09G 5/00* (2006.01)
- *G06F 3/01* (2006.01)
- *G02B 27/02* (2006.01)
- *G09G 3/00* (2006.01)
- *H04N 13/204* (2018.01)
- *G06F 3/16* (2006.01)

(52) U.S. Cl.
CPC ............... *G06F 3/16* (2013.01); *G09G 3/001* (2013.01); *G09G 5/00* (2013.01); *H04N 5/64* (2013.01); *H04N 13/204* (2018.05)

(56) References Cited

U.S. PATENT DOCUMENTS

| | | | |
|---|---|---|---|
| 10,134,185 | B2 | 11/2018 | Kihara |
| 2002/0008677 | A1* | 1/2002 | Saito ............... G02B 27/0176 345/8 |
| 2005/0213593 | A1* | 9/2005 | Anderson ......... H04L 29/06027 370/419 |
| 2010/0302143 | A1* | 12/2010 | Spivack ............. G06F 21/6209 345/157 |
| 2012/0249741 | A1* | 10/2012 | Maciocci ................ G06F 3/011 348/46 |
| 2013/0135722 | A1 | 5/2013 | Yokoyama |
| 2013/0300949 | A1 | 11/2013 | Yamamoto |
| 2013/0335536 | A1 | 12/2013 | Kura |
| 2014/0126782 | A1* | 5/2014 | Takai .................... G06K 9/0061 382/116 |
| 2014/0361976 | A1 | 12/2014 | Osman |
| 2014/0362370 | A1 | 12/2014 | Bickerstaff |
| 2015/0317830 | A1* | 11/2015 | Kihara .................... A61B 6/462 345/156 |
| 2016/0163310 | A1* | 6/2016 | Lee ......................... G10L 15/16 704/232 |
| 2016/0266412 | A1* | 9/2016 | Yoshida ............. G02B 27/0172 |
| 2016/0291327 | A1* | 10/2016 | Kim ...................... G02B 27/017 |

FOREIGN PATENT DOCUMENTS

| | | | |
|---|---|---|---|
| EP | 3157173 A1 * | 4/2017 | ........... H04B 5/0031 |
| JP | 2009171505 A | 7/2009 | |
| JP | 2013258555 A * | 12/2013 | ............... H04N 5/64 |
| JP | 2015028654 A | 2/2015 | |
| WO | 2014103193 A1 | 7/2014 | |

OTHER PUBLICATIONS

International Search Report for corresponding PCT Application No. PCT/JP2016/066658, 2 pages, dated Aug. 2, 2016.
Extended European Search Report for corresponding EP Application No. 16807406.0, 9 pages, dated Jan. 18, 2019.
International Preliminary Report on Patentability and Written Opinion for corresponding PCT Application No. PCT/JP2016/066658, 6 pages, dated Dec. 12, 2017.
The first office action for corresponding CN Application No. 201680032836.7, 17 pages, dated Aug. 26, 2019.

* cited by examiner

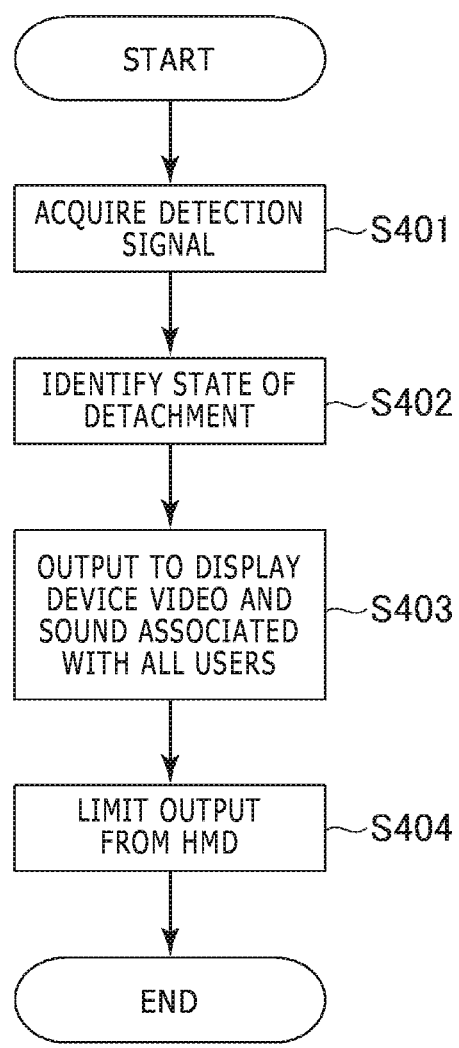

CONTROL DEVICE, CONTROL METHOD, AND PROGRAM

TECHNICAL FIELD

The present invention relates to a control device, a control method, and a program.

BACKGROUND ART

There has been developed a head-mounted display that a user wears on the user's head to view a video or the like. In the future, in viewing a video or the like, the user is expected to switch between a display device such as a television (TV) receiver, a display, and a mobile terminal for the user to view the video at a distance, and the head-mounted display that the user wears on the head to view the video. It is conventionally known that the user switches a video output by switching between a stationary display device of a TV receiver and a portable display device operated at hand by the user such as a portable game machine and a tablet terminal.

SUMMARY

Technical Problem

Because of the characteristics of the head-mounted display which the user wears on the head to view on the display, the user cannot see the outside because the view is blocked in the state that the user is wearing the head-mounted display. Further, once the user wears the headphone, external sound becomes unnecessary. Therefore, power consumption can be reduced by limiting the unnecessary output from the display device while the user is wearing the head-mounted display. By limiting the sound output from the display device, there is an effect that the user can concentrate on the viewing using the head-mounted display. When the display device is designed to resume the output as soon as the user detaches the head-mounted display, the user can immediately utilize the display device by detaching the head-mounted display. As described above, when the output from the display device is limited in accordance with the wearing of the head-mounted display, a suitable viewing environment can be provided.

On the other hand, a suitable viewing environment can be provided in some cases by adding output from the display device by not only limiting output from the display device in accordance with the wearing of the head-mounted display. For example, in a game joined by a plurality of people, fun of the game can be improved by arranging such that one user wears the head-mounted display and information which should not be depicted to the user wearing the head-mounted display is displayed on the display device.

As described above, it is desirable to provide a suitable viewing environment in accordance with the wearing or detachment of the head-mounted display. Provision of this suitable viewing environment has been unable to be realized because the utilization of the head-mounted display has not taken into consideration.

The present invention has been made to solve the above problem, and has an object of providing a suitable viewing environment in accordance with the wearing or detachment of the head-mounted display.

Solution to Problem

In order to solve the above problem, a control device according to the present invention includes an identification unit configured to identify wearing or detachment of a head-mounted display, and an output control unit configured to control, in accordance with the wearing or detachment, at least one output of sound output and video output from a display device which is provided separately from the head-mounted display.

In the above control device, the output control unit may limit, in accordance with the wearing of the head-mounted display, at least one output of sound output and video output from the display device which is provided separately from the head-mounted display.

In the above control device, the output control unit may cancel, in accordance with the detachment of the head-mounted display, the output limitation of the display device which is provided separately from the head-mounted display.

In the above control device, the output control unit may limit, in accordance with the wearing of the head-mounted display, sound output and video output, by turning off a power source, of the display device which is provided separately from the head-mounted display.

In the above control device, the output control unit may cancel, in accordance with the detachment of the head-mounted display, the limit of sound output and video output, by turning on the power source, of the display device which is provided separately from the head-mounted display.

The control device further includes a user identification unit configured to identify a user who wears the head-mounted display, and the output control unit may make the display device, which is provided separately from the head-mounted display, output at least one of sound output and video output, for a user different from the identified user.

In the above control device, the output control unit may limit at least one of sound output and video output that is output in accordance with the detachment of the head-mounted display.

A control method according to the present invention includes an identifying step of identifying wearing or detachment of a head-mounted display, and an output control step of controlling, in accordance with the wearing or detachment, at least one output of sound output and video output from a display device which is provided separately from the head-mounted display.

A program according to the present invention makes a computer function as an identification unit configured to identify wearing or detachment of a head-mounted display and an output control unit configured to control, in accordance with the wearing or detachment, at least one output of sound output and video output from a display device which is provided separately from the head-mounted display. This program may be stored in a computer readable information storage medium.

BRIEF DESCRIPTION OF DRAWINGS

FIG. 11 is a flowchart depicting an example of an output control process of the display device when the user detaches the HMD performed by the control device according to the second embodiment.

DESCRIPTION OF EMBODIMENTS

First Embodiment

Hereinafter, a first embodiment as one embodiment of the present invention will be described with reference to the drawings.

System Configuration

Figure 1:
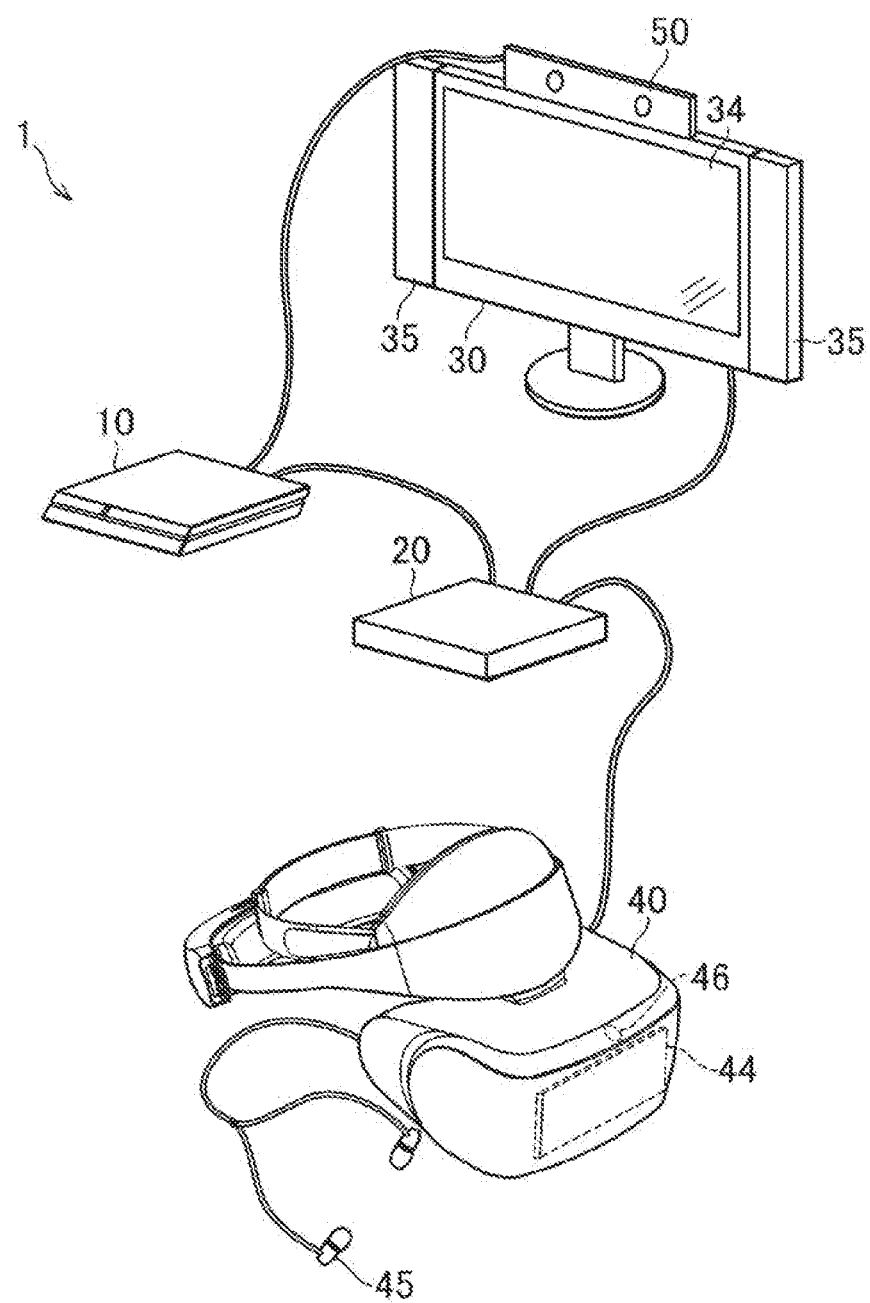
FIG. 1 is a view depicting an example of a total configuration of a video display system according to a first embodiment.

FIG. 1 is a view depicting an example of a total configuration of a video display system 1 according to the first embodiment. As depicted in FIG. 1, the video display system 1 according to the first embodiment is configured to include an entertainment device 10, a control device 20, a display device 30, a head-mounted display (HMD) 40, and a camera unit 50. The entertainment device 10 and the control device 20 are connected together via a high-definition multimedia interface (HDMI) (a registered tradename) cable or a universal serial bus (USB) cable, for example. The control device 20 and the display device 30 are connected together via the HDMI cable, for example. The control device 20 and the HMD 40 are connected together via the HDMI cable or a USB cable, for example. The entertainment device 10 and the camera unit 50 are connected together via the USB cable, for example.

The entertainment device 10 is an information processing device such as a home-use game machine, a digital versatile disc (DVD) player, and a Blu-ray (a registered tradename) player, for example. The entertainment device 10 according to the first embodiment outputs to the control device 20 a video signal expressing a video generated by performance of an installed game program or by reproduction of a disk of a read optical disk, for example, and a sound signal expressing sound.

The control device 20 is an information processing device that controls the display device 30 and the HMD 40, by relaying signals between the entertainment device 10, the display device 30, and the HMD 40. The control device 20 according to the first embodiment acquires a video signal and a sound signal that are output from the entertainment device 10. Then, the control device 20 outputs to the HMD 40 a video signal and a sound signal for the HMD 40, and outputs to the display device 30 a video signal and a sound signal for the display device 30. Each signal output to the HMD 40 and the display device 30 may be a signal obtained by conversion by the control device 20. For example, the control device 20 may convert each signal for the HMD 40 which is output from the entertainment device 10, into a signal suitable for the display device 30. Then, the control device 20 outputs the obtained signal to the display device 30. Alternatively, the control device 20 may convert each signal for the display device 30 which is output from the entertainment device 10, into a signal suitable for the HMD 40. Then, the control device 20 outputs the obtained signal to the HMD 40.

The display device 30 is a stationary display device such as a home television receiving apparatus, for example, disposed at a distance from the user for the user to view a video. The display device 30 according to the first embodiment makes a first display unit 34 display a video expressed by the video signal received from the control device 20, and makes a first sound output unit 35 output sound expressed by the sound signal received from the control device 20.

The HMD 40 is an eye mount video display device that is mounted on the head of the user. The HMD 40 presents a video such as a still image and a moving image to the user by using a display device equipped in the HMD 40. The HMD 40 according to the first embodiment makes a second display unit 44 display a video expressed by the video signal received from the control device 20, and makes a second sound output unit 45 output the sound expressed by the sound signal received from the control device 20.

Hardware Configuration

Figure 2:
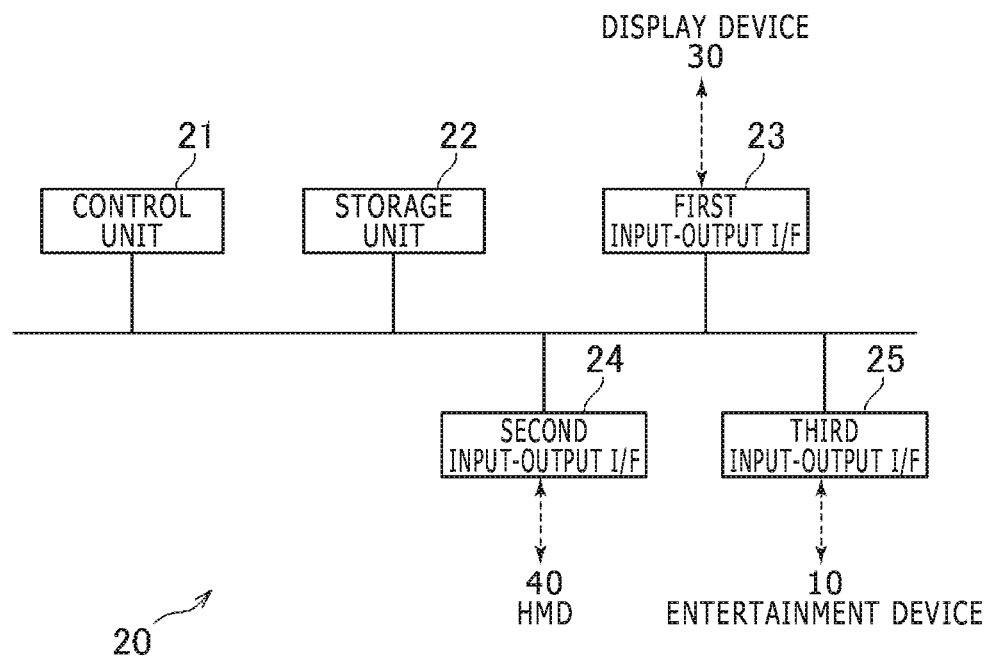
FIG. 2 is a diagram depicting an example of a hardware configuration of a control device according to the first embodiment.

FIG. 2 is a diagram depicting an example of a hardware configuration of the control device 20 according to the first embodiment. As depicted in FIG. 2, the control device 20 according to the first embodiment is configured to include a control unit 21, a storage unit 22, a first input-output interface (I/F) 23, a second input-output I/F 24, and a third input-output I/F 25.

The control unit 21 includes a program control device such as a central processing unit (CPU), and performs various kinds of information processing in accordance with a program stored in the storage unit 22.

The storage unit 22 includes memory elements such as a random access memory (RAM) and a read-only memory (ROM), and stores programs performed by the control unit 21. The storage unit 22 also functions as a work memory of the control unit 21.

The first input-output I/F 23 is an interface such as an HDMI port and a USB port, for example, for connecting the control device 20 to the display device 30. The first input-output I/F 23 outputs various signals to the display device 30 in accordance with an instruction from the control unit 21. Further, the first input-output I/F 23 receives a signal output from the display device 30, and outputs the received signal to the control unit 21.

The second input-output I/F 24 is an interface such as an HDMI port and a USB port, for example, for connecting the control device 20 to the HMD 40. The second input-output I/F 24 outputs various signals to the HMD 40 in accordance with an instruction from the control unit 21. Further, the second input-output I/F 24 receives a signal output from the HMD 40, and outputs the received signal to the control unit 21.

The third input-output I/F 25 is an interface such as an HDMI port and a USB port, for example, for connecting the control device 20 to the entertainment device 10. The third input-output I/F 25 outputs various signals to the entertainment device 10 in accordance with an instruction from the control unit 21. Further, the third input-output I/F 25 receives a signal output from the entertainment device 10, and outputs the received signal to the control unit 21.

Figure 3:
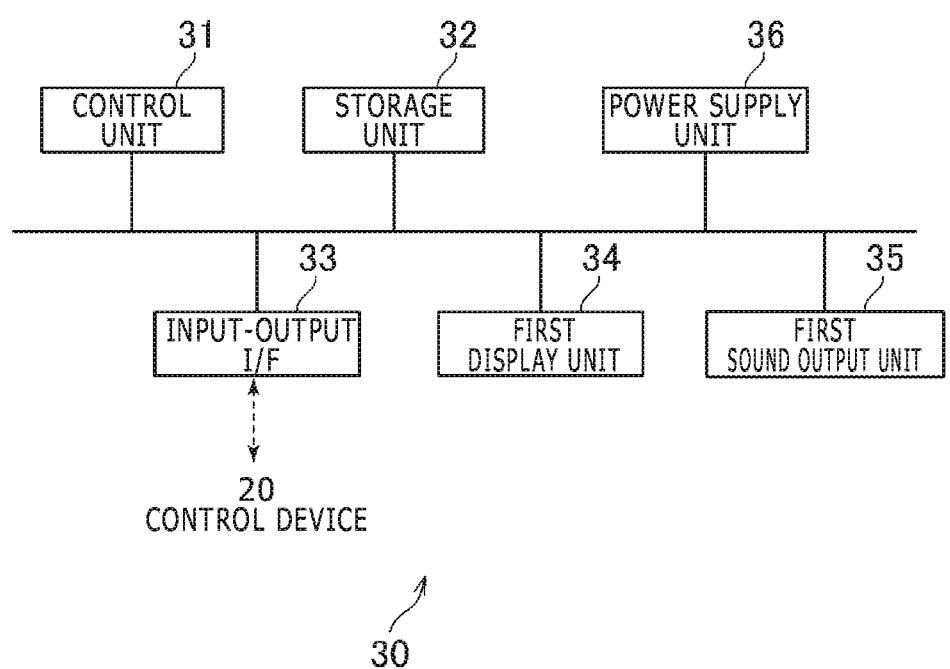
FIG. 3 is a diagram depicting an example of a hardware configuration of a display device according to the first embodiment.

FIG. 3 is a diagram depicting an example of a hardware configuration of the display device 30 according to the first embodiment. As depicted in FIG. 3, the display device 30 according to the first embodiment is configured to include a control unit 31, a storage unit 32, an input-output I/F 33, the first display unit 34, the first sound output unit 35, and a power supply unit 36.

The control unit 31 includes a program control device such as a CPU, and performs various kinds of information processing in accordance with a program stored in the storage unit 32.

The storage unit 32 includes memory elements such as a RAM and a ROM, and stores programs performed by the control unit 31. The storage unit 32 also functions as a work memory of the control unit 31.

The input-output I/F 33 is an interface such as an HDMI port and a USB port, for example, for connecting the control device 20 to the display device 30. The input-output I/F 33 outputs various signals to the control device 20 in accordance with an instruction from the control unit 31. Further, the input-output I/F 33 receives a signal output from the control device 20, and outputs the received signal to the control unit 31.

The first display unit 34 is a display device such as a liquid crystal display and an organic electroluminescence (EL) display, and displays a video expressed by the video signal output from the control device 20.

The first sound output unit 35 is a sound output device such as an internal speaker, for example, incorporated in the display device 30, and outputs sound expressed by the sound signal output from the control device 20. The first sound output unit 35 may be provided separately from the display device 30.

The power supply unit 36 supplies power, required for the operation of each unit of the display device 30, to the units. The power supply unit 36 is configured to include a switching circuit, for example, and can individually supply or stop power to each unit of the display device 30 in accordance with a control signal output from the control device 20. With this arrangement, it is possible to make the display device 30 function in a power saving mode such as a power-off state and a sleep state.

Figure 4:
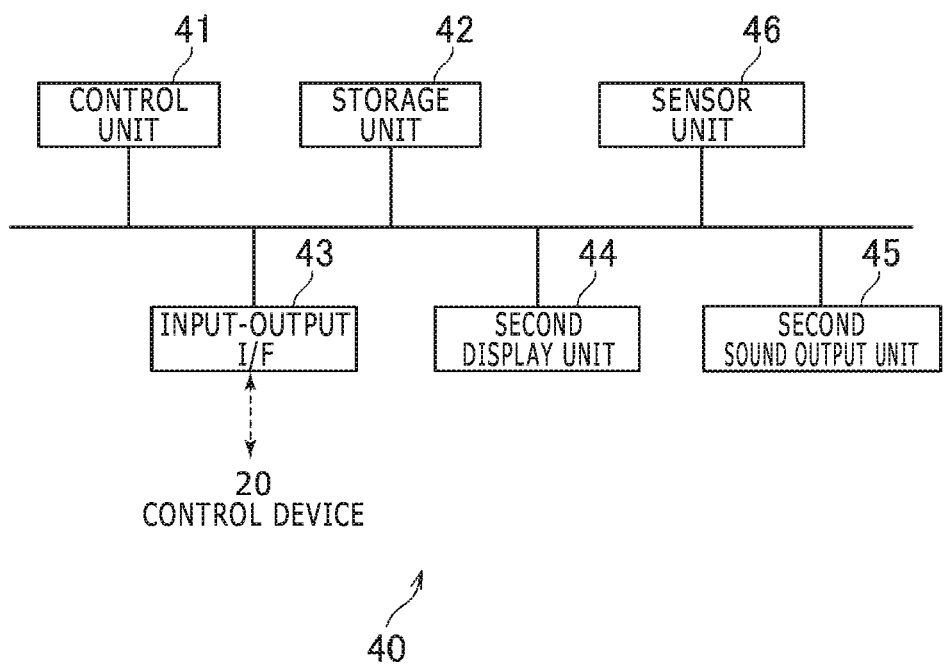
FIG. 4 is a diagram depicting an example of a hardware configuration of a head-mounted display (HMD) according to the first embodiment.

FIG. 4 is a diagram depicting an example of a hardware configuration of the HMD 40 according to the first embodiment. As depicted in FIG. 4, the HMD 40 according to the first embodiment is configured to include a control unit 41, a storage unit 42, an input-output I/F 43, the second display unit 44, the second sound output unit 45, and a sensor unit 46.

The control unit 41 includes a program control device such as a CPU, and performs various kinds of information processing in accordance with a program stored in the storage unit 42.

The storage unit 42 includes memory elements such as a RAM and a ROM, and stores programs performed by the control unit 41. The storage unit 42 also functions as a work memory of the control unit 41.

The input-output I/F 43 is an interface such as an HDMI port and a USB port, for example, for connecting the control device 20 to the HMD 40. The input-output I/F 43 outputs various signals to the control device 20 in accordance with an instruction from the control unit 41. Further, the input-output I/F 43 receives a signal output from the control device 20, and outputs the received signal to the control unit 41.

The second display unit 44 is a display device such as a liquid crystal display or an organic EL display, and displays a video expressed by the video signal output from the control device 20.

The second sound output unit 45 is a sound output device such as an earphone and a headphone, for example, used by being attached to the user's ears, and outputs the sound expressed by the sound signal output from the control device 20.

The sensor unit 46 is a sensor such as an infrared sensor and a contact sensor, for example, and detects whether the user wears the HMD 40. It is assumed, for example, that the infrared sensor is provided in the HMD 40 at a position opposite to the face of the user (that is, a position adjacent to the second display unit 44) in the state that the HMD is mounted. In this case, the infrared sensor irradiates an object with infrared light, and measures a distance from the object by detecting reflected light obtained. By utilizing the measurement, the infrared sensor detects whether the face of the user is located at the position opposite to the infrared sensor or the second display unit 44. Based on this operation, the infrared sensor detects whether the user wears the HMD 40. In place of the infrared sensor, there may be also provided a device called an image pickup element such as a charge-coupled device (CCD) image sensor capable of detecting the face of the user. Further, when the contact sensor is provided at a position where the HMD 40 and the user are in contact with each other in the state that the HMD 40 is mounted on the user, the contact sensor can detect whether the user wears the HMD 40, based on whether the contact sensor has detected the contact. The sensor unit 46 according to the first embodiment may detect whether the user's view is blocked by the HMD.

Utilization Scene of Video Display System

A utilization scene of the video display system 1 according to the first embodiment will be described.

Figure 5A:
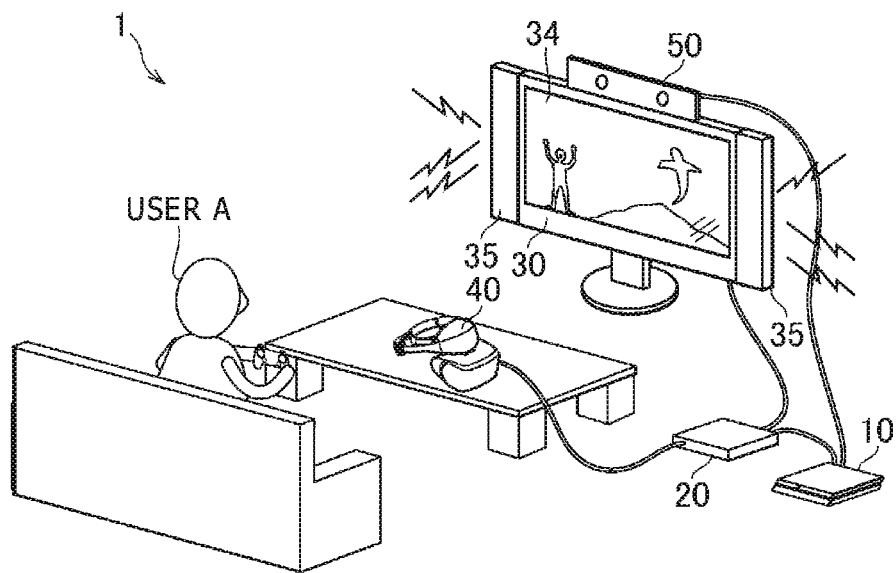
FIG. 5A is a view depicting an example of a utilization scene of a video display system according to the first embodiment.
Figure 5B:
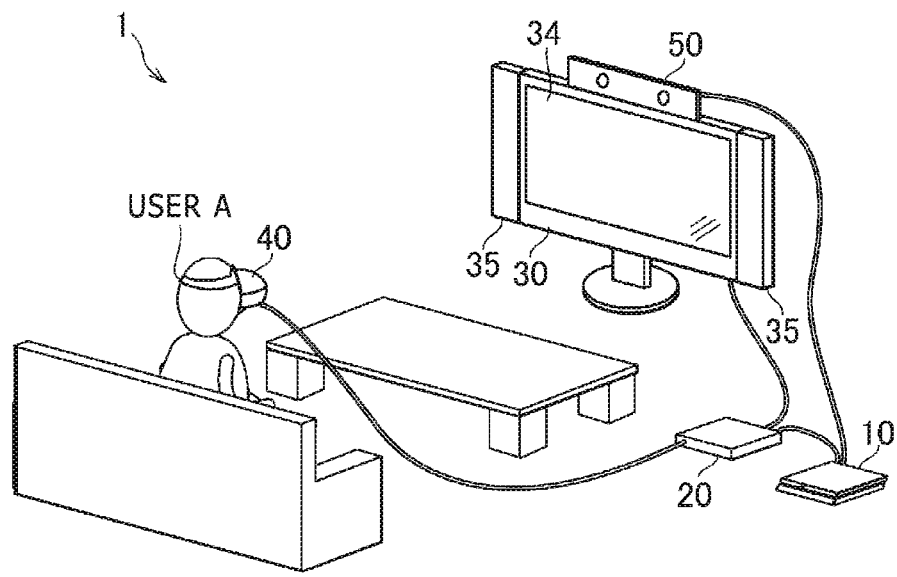
FIG. 5B is a view depicting an example of a utilization scene of a video display system according to the first embodiment.

FIGS. 5A and 5B are views depicting an example of a utilization scene of the video display system 1 according to the first embodiment. FIGS. 5A and 5B depict a state that one user (in this case, a user A) plays a game using the video display system 1. By wearing or detaching the HMD 40, the user A can freely switch between performance of a game for which the display device 30 is used and performance of a game for which the HMD 40 is used.

FIG. 5A depicts a state that the user A is performing a game with the display device 30. A game video is displayed on the first display unit 34 of the display device 30, and sound is output from the first sound output unit 35 of the display device 30. Then, the HMD 40 is in the state of being detached from the user A. When the user A wears the HMD 40 in the state that a video and sound are output to the display device 30 as depicted in FIG. 5A, the video and the sound of the game are output to the HMD 40, and the user performs the rest of the game with the HMD 40. At this time, as depicted in FIG. 5B, the video is not displayed on the first display unit 34 of the display device 30, and the sound is not output from the first sound output unit 35 of the display device 30.

When the user A detaches the HMD 40 in the state that the user A is performing the game by wearing the HMD 40 as depicted in FIG. 5B, the video and the sound are not output to the HMD 40. At this time, the game video becomes in the state of being displayed on the first display unit 34 of the display device 30, and the sound becomes in the state of being output from the first sound output unit 35 of the display device 30, as depicted in FIG. 5A. Therefore, the user can perform the rest of the game by using the display device 30.

Because of the characteristics of the HMD 40, when the HMD 40 is mounted, the view is blocked and the user cannot see the outside. That is, the video and the sound output from the external display device 30 become unnecessary for the user to perform the game with the HMD 40. Particularly, the sound output from the display device 30 becomes noise for the user to perform the game with the HMD 40. The noise hinders utilization of the HMD 40, and is desirably stopped. Further, by stopping the unnecessary video output and sound output from the display device 30, there is an effect that power consumption can be suppressed. Therefore, in the first embodiment, while the user is wearing the HMD 40, the sound and the video output from the display device 30 are limited. When the user detaches the HMD 40, the sound output and video output from the display device 30 are resumed. In this way, the output from the display device 30 is controlled in accordance with the wearing and detachment of the HMD 40.

Functional Block Diagram

Functions realized by the video display system 1 according to the first embodiment will be described in detail below.

Figure 6:
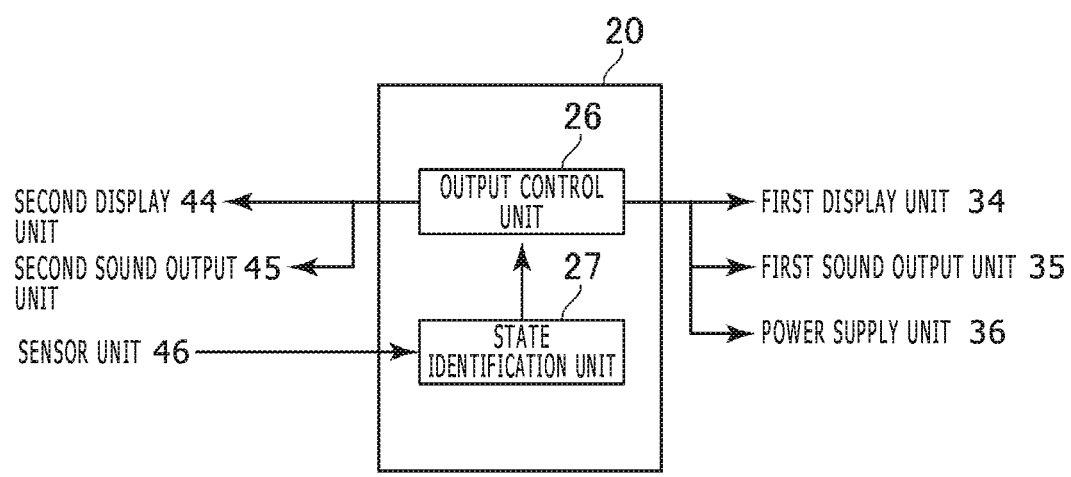
FIG. 6 is a functional block diagram depicting an example of a main function realized by the control device according to the first embodiment.

FIG. 6 is a functional block diagram depicting an example of main functions realized by the control device 20 according to the first embodiment. As depicted in FIG. 6, the control device 20 according to the first embodiment is functionally configured to include a state identification unit 26 and an output control unit 27. These functions are realized by the control unit 21 which performs a program stored in the storage unit 22. This program may be provided by being stored in various computer readable information storage mediums such as an optical disk, or may be provided to the control device 20 via a communication network such as the Internet.

The state identification unit 26 acquires a detection result of the sensor unit 46 of the HMD 40, and identifies a state of the HMD 40 in accordance with the detection result. In this case, the HMD 40 indicates a state that the HMD 40 is mounted on the user, or a state that the HMD 40 is detached from the user. Specifically, when the sensor unit 46 detects the user, the sensor unit 46 identifies that the HMD 40 is in the state of being mounted on the user. On the other hand, when the sensor unit 46 does not detect the user, the sensor unit 46 identifies that the HMD 40 is in the state of being detached from the user. The HMD 40 may indicate the state that the user's view is blocked by the HMD, or the state that the user can see the outside of the HMD.

The state identification unit 26 may identify the state of the HMD 40, based on a moving image captured by the camera unit 50. In this case, the camera unit 50 captures the moving image of the user, and the state identification unit 26 acquires the moving image captured by the camera unit 50, from the entertainment device 10, at each predetermined time. Then, the state identification unit 26 analyzes the acquired moving image, and identifies whether the HMD 40 is in the state of being mounted on the user or the HMD 40 is in the state of being detached from the user. The state identification unit 26 may identify a state of the HMD 40 in accordance with a result of video analysis performed by the entertainment device 10.

The output control unit 27 controls video output from the display device 30 and/or sound output from the display device 30, in accordance with a result of identification by the state identification unit 26. Further, the output control unit 27 controls video output from the HMD 40 and/or sound output from the HMD 40, in accordance with a result of identification by the state identification unit 26.

Specifically, when the state identification unit 26 has identified that the HMD 40 is in the state of being mounted on the user, the output control unit 27 limits sound output from the first sound output unit 35 of the display device 30. Specifically, when the output control unit 27 stops outputting a sound signal to the display device 30, the sound from the first sound output unit 35 of the display device 30 is not output. Further, when the output control unit 27 outputs a control signal to the display device 30 for controlling the sound volume, the volume of sound output from the first sound output unit 35 of the display device 30 can be controlled. For example, when the control device 20 outputs to the display device 30 a control signal for muting the volume, the sound output from the first sound output unit 35 of the display device 30 is muted. The control device 20 may output to the display device 30 a control signal for reducing the sound volume so as to reduce the volume of sound output from the first sound output unit 35 of the display device 30. On the other hand, when the state identification unit 26 has identified that the HMD 40 is in the state of being mounted on the user, the output control unit 27 starts video output to the HMD 40 and/or sound output from the HMD 40. That is, the output control unit 27 outputs a video signal and/or a sound signal to the HMD 40.

With the above arrangement, sound output from the display device 30 that becomes unnecessary when the user wears the HMD 40 can be stopped or reduced. The user can concentrate on utilization of the HMD 40 by reducing noise from the outside. Stopping or reducing the sound output also has the effect of reducing unnecessary power consumption.

Next, when the state identification unit 26 has identified that the HMD 40 is in the state of being detached from the user, the output control unit 27 cancels the limitation of the sound output from the first sound output unit 35 of the display device 30. Specifically, when the output control unit 27 has stopped outputting a sound signal to the display device 30, the output control unit 27 starts outputting a sound signal to the display device 30. Further, when the output control unit 27 is outputting to the display device 30 a control signal for muting or reducing the sound volume, the output control unit 27 outputs to the display device 30 a control signal for canceling the muting or reduction of the sound volume. With this arrangement, the sound output from the first sound output unit 35 of the display device 30 is resumed. On the other hand, when the state identification unit 26 has identified that the HMD 40 is in the state of being detached from the user, the output control unit 27 limits video output from the HMD 40 and/or sound output from the HMD 40. That is, the output control unit 27 stops outputting a video signal and/or a sound signal to the HMD 40.

When the state identification unit 26 has identified that the HMD 40 is in the state of being mounted on the user, the output control unit 27 may limit video output from the first display unit 34 of the display device 30. Specifically, by arranging such that the output control unit 27 stops outputting a video signal to the display device 30, the video is not output to the first display unit 34 of the display device 30.

With this arrangement, video output from the display device 30 that becomes unnecessary when the user wears the HMD 40 can be stopped. As a result, unnecessary power consumption can be reduced.

In this case, when the state identification unit 26 has identified that the HMD 40 is in the state of being detached from the user, the output control unit 27 cancels the limitation of video output from the first display unit 34 of the display device 30. Specifically, when the output control unit 27 stops outputting a video signal to the display device 30, the output control unit 27 starts outputting a video signal to the display device 30. With this arrangement, video output from the first display unit 34 of the display device 30 is resumed.

When the state identification unit 26 has identified that the HMD 40 is in the state of being mounted on the user, the output control unit 27 may limit both video output from the first display unit 34 and sound output from the first sound output unit 35 of the display device 30. Specifically, by arranging such that the output control unit 27 stops outputting a video signal and a sound signal to the display device 30, neither a video nor sound is output from the display device 30. Further, the output control unit 27 may output a control signal for operating the power supply unit 36 of the display device 30 so as to control power supply to the display device 30. For example, when the control device 20 outputs to the display device 30 a control signal for turning off power supply to the display device 30, the power supply unit 36 stops power supply to the display device 30. As a result, video output from the first display unit 34 and sound output from the first sound output unit 35 are stopped. The control device 20 may output to the display device 30 a control signal for setting the display device 30 to a sleep state. In this case, it may be arranged such that when the power supply unit 36 stops power supply to some of functions of the display device 30, video output from the first display unit 34 and sound output from the first sound output unit 35 are stopped.

In this case, when the state identification unit 26 has identified that the HMD 40 is in the state of being detached from the user, the output control unit 27 cancels limitation of both video output from the first display unit 34 and sound output from the first sound output unit 35 of the display device 30. Specifically, by arranging such that the output control unit 27 outputs to the display device 30 a control signal for turning on the power supply to the display device 30, the power supply unit 36 starts supplying power to the display device 30, so that video output from the first display unit 34 and sound output from the first sound output unit 35 are resumed. The output control unit 27 may output to the display device 30 a control signal for cancelling the sleep state of the display device 30. In this case, it may be arranged such that when the power supply unit 36 starts supplying power to the first display unit 34 and the first sound output unit 35, video output from the first display unit 34 and sound output from the first sound output unit 35 are resumed.

With the above arrangement, by stopping power supply to the display device 30 which becomes unnecessary when the user wears the HMD 40, external video output and sound output stop. As a result, the user can concentrate on utilization of the HMD 40, and unnecessary power consumption can be reduced.

It may be arranged such that when the output control unit 27 outputs to the display device 30 a control signal for operating the screen setting of the display device 30, the video output from the first display unit 34 of the display device 30 is controlled. For example, when the control device 20 outputs to the display device 30 a control signal for lowering the brightness of the screen or turning off the backlight, the video output from the first output unit of the display device 30 can be lowered and power consumption be reduced.

Output Control Process

Figure 7:
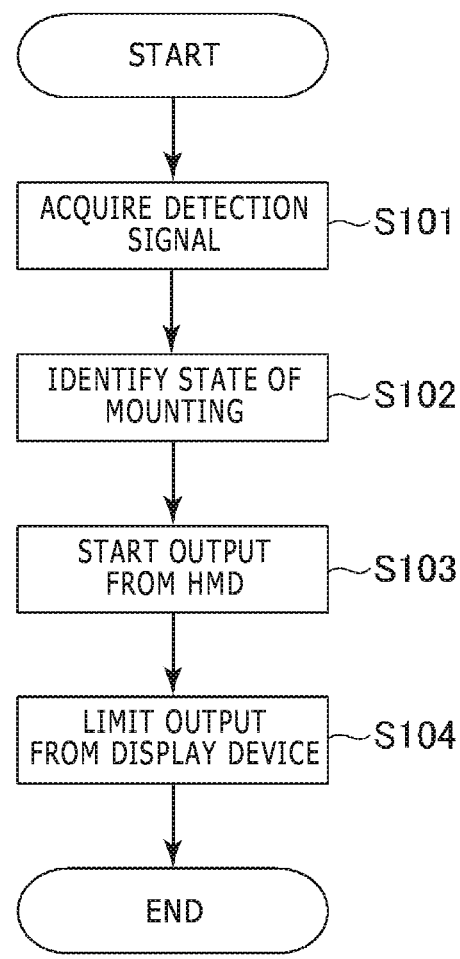
FIG. 7 is a flowchart depicting an example of an output control process of a display device when a user wears the HMD performed by the control device according to the first embodiment.

An example of an output control process of the display device 30 when the user wears the HMD 40, performed by the control device 20 according to the first embodiment, will be described with reference to a flowchart of FIG. 7.

First, when the user A wears the HMD 40 in the state that the video and sound of the game are output to the display device 30 as depicted in FIG. 5A, a detection signal detected by the sensor unit 46 of HMD 40 is transmitted to the control device 20.

The state identification unit 26 of the control device 20 acquires the detection signal transmitted from the HMD 40 (S101), and identifies the state of the HMD 40 based on the acquired detection signal (S102). In this case, the state identification unit 26 of the control device 20 identifies that the HMD 40 is in the state of being mounted on the user, based on the detection signal indicating the detection of the user.

Because the state identification unit 26 of the control device 20 has identified that the HMD 40 is in the state of being mounted on the user in process S102, the output control unit 27 of the control device 20 starts outputting from the HMD 40 (S103). The output control unit 27 of the control device 20 limits the output from the display device 30 (S104), and ends the process. In this case, as depicted in FIG. 5B, the user is wearing the HMD 40, and the display device 30 becomes in the state of not outputting the video and sound of the game.

Figure 8:
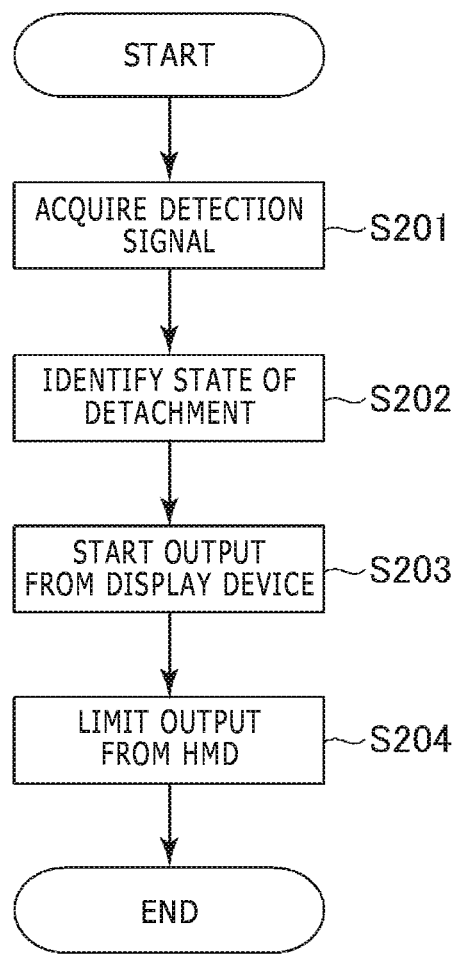
FIG. 8 is a flowchart depicting an example of an output control process of the display device when the user detaches the HMD performed by the control device according to the first embodiment.

Next, an example of an output control process of the display device 30 when the user detaches the HMD 40, performed by the control device 20 according to the first embodiment, will be described, with reference to a flowchart of FIG. 8.

First, when the user A detaches the HMD 40 in the state that the video and sound of the game are not output to the display device 30 as depicted in FIG. 5B, a detection signal detected by the sensor unit 46 of HMD 40 is transmitted to the control device 20.

The state identification unit 26 of the control device 20 acquires the detection signal transmitted from the HMD 40 (S201). The state identification unit 26 of the control device 20 identifies the state of the HMD 40 based on the acquired detection signal (S202). In this case, the state identification unit 26 of the control device 20 identifies that the HMD 40 is in the state of being detached from the user, based on the detection signal indicating the detection of the user.

Because the state identification unit 26 of the control device 20 has identified that the HMD 40 is in the state of being detached from the user in process S202, the output control unit 27 of the control device 20 starts outputting from the display device 30 (S203). The output control unit 27 of the control device 20 limits the output from the HMD 40 (S204), and ends the process. In this case, as depicted in FIG. 5A, the user has detached the HMD 40, and the display device 30 becomes in the state of outputting the video and sound of the game.

Second Embodiment

Hereinafter, there will be described a second embodiment as another embodiment of the present invention.

In considering the characteristics that the user who wears the HMD 40 cannot see the outside because of blocked view, there is considered a utilization that the video and the sound that the user wearing the HMD 40 should not view or listen to are output to the display device 30. In the first embodiment, while the user is wearing the HMD 40, the output of a video and sound from the display device 30 is limited. However, in a second embodiment, when the user wears the HMD 40, a video and sound for a user different from the user wearing the HMD 40 are output to the display device 30. Further, because the user not wearing the HMD 40 cannot view or listen to the video and the sound output to the HMD 40, the video and the sound for only the user wearing the HMD 40 can be output to the HMD 40.

Figure 9A:
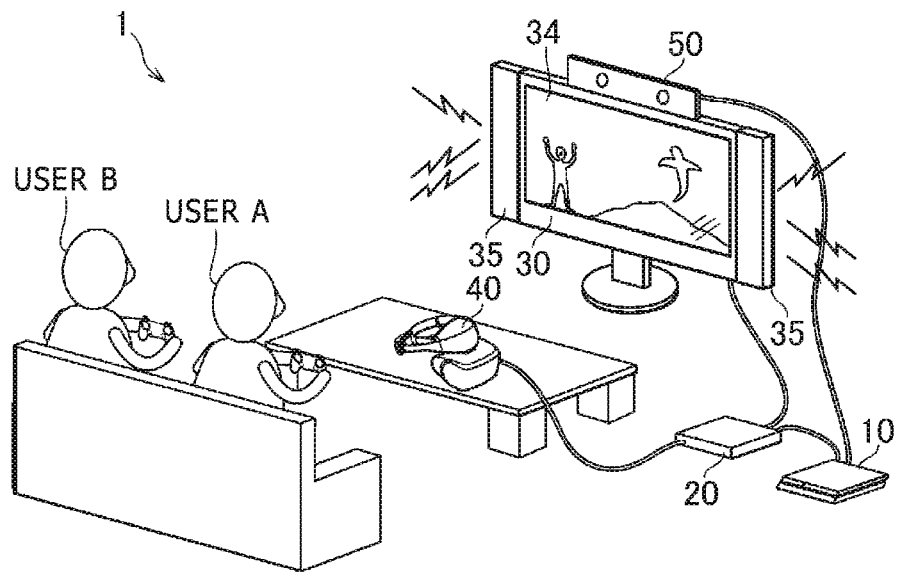
FIG. 9A is a view depicting an example of a utilization scene of the video display system according to a second embodiment.
Figure 9B:
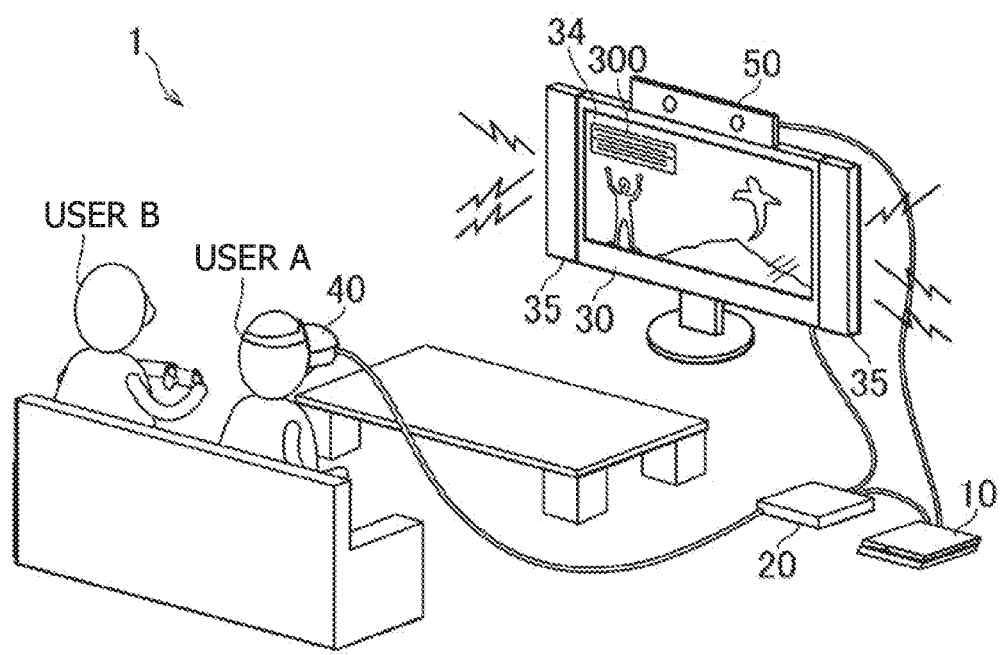
FIG. 9B is a view depicting an example of a utilization scene of the video display system according to a second embodiment.

FIGS. 9A and 9B are views depicting examples of a utilization scene of the video display system 1 according to the second embodiment. FIGS. 9A and 9B depict a state that a plurality of users (in this case, the user A and the user B) are performing a game together by using the video display system 1. FIG. 9A depicts a state that the user A and the user B are performing the game together by using the display device 30. A game video is displayed on the first display unit 34 of the display device 30, and sound of the game is output from the first sound output unit 35 of the display device 30. The HMD 40 is in the state of not being mounted on any user. When the user A wears the HMD 40 in the state that the video and the sound are output from the display device 30 as depicted in FIG. 9A, the video and the sound for the user A are output to the HMD 40. In this case, as depicted in FIG. 9B, the video and the sound for the user B are output to the display device 30. For example, a user target video 300 as a video for the user B is added to the first display unit 34.

When the user A detaches the HMD 40 in the state that the user A is wearing the HMD 40 as depicted in FIG. 9B, the video and the sound are not output to the HMD 40. As depicted in FIG. 9A, the video and the sound of the game are output to the display device 30, but the user target video 300 displayed on the first display unit 34 in FIG. 9B is not displayed in this case.

Functions realized by the video display system 1 according to the second embodiment will be described in detail below.

First, the video display system 1 according to the second embodiment is similar to the video display system 1 according to the first embodiment except that the sensor unit 46 of the HMD 40, and the state identification unit 26 and the output control unit 27 of the control device 20 have different functions. Therefore, a redundant description will be omitted here.

The sensor unit 46 of the HMD 40 according to the second embodiment includes an image pickup element such as a CCD image sensor, a complementary metal oxide semiconductor (CMOS) image sensor, and an infrared image sensor. The image pickup element detects a user by capturing a face image of the user when the HMD 40 is mounted on the user. It may be arranged such that the infrared sensor or the contact sensor detects the user, and the CCD image sensor or the CMOS image sensor captures a face image of the user for identifying the user.

The state identification unit 26 of the control device 20 according to the second embodiment identifies the state of the HMD 40 and identifies the user who is wearing the HMD 40, in accordance with the detection result of the sensor unit 46 of the HMD 40. Specifically, the state identification unit 26 acquires the face image of the user captured by the sensor unit 46, and extracts feature information by using a known face recognition technology or iris recognition technique.

Then, the state identification unit 26 identifies the user by collating the extracted feature information with the feature information of a registered user registered in advance. With this arrangement, the HMD 40 can be identified as being mounted on the user, and the user wearing the HMD 40 can be identified. Further a method of identifying the user wearing the HMD 40 is not limited to the above example. For example, the user may be identified using the feature information extracted by known speech recognition from a speech generated by the user collected by a microphone unit provided in the HMD 40. Alternatively, the user may be identified by causing the user wearing the HMD 40 to perform a log-in operation. The user may be identified using a user image captured with the camera unit 50.

The output control unit 27 according to the second embodiment controls the video output from the display device 30 and/or the sound output from the display device 30, in accordance with the result of identification by the state identification unit 26. Further, the output control unit 27 according to the second embodiment controls video output from the HMD 40 and/or the sound output from the HMD 40, in accordance with the result of identification by the state identification unit 26.

Specifically, the output control unit 27 according to the second embodiment makes the HMD 40 output the video and/or the sound for the identified user, when the HMD 40 is identified to be in the state of being mounted on the user. For example, the output control unit 27 makes the HMD 40 output chat sound or a message, transmitted from the entertainment device 10 in association with a user identifier of the identified user. In this case, the output control unit 27 can output the video and/or sound to the display device 30, but limits output of the video and/or the sound for only the user wearing the HMD 40.

When the state identification unit 26 has identified that the HMD 40 is in the state of being detached from the user, the output control unit 27 limits the video output and the sound output from the HMD 40, and outputs all videos and/or sound to the display device 30.

As described above, by identifying the user wearing the HMD 40 and by outputting to the HMD 40 the video and the sound for only the identified user, the video and the sound can be provided to the identified user without being known to other users.

Further, when the state identification unit 26 has identified that the HMD 40 is in the state of being mounted on the user, the output control unit 27 according to the second embodiment makes the display device 30 output the video and/or the sound for the user different from the identified user. For example, the output control unit 27 may make the display device 30 output the video and/or sound with which a user identifier of the identified user is not associated. Alternatively, the output control unit 27 may identify other user not wearing the HMD 40, using the camera unit 50 or the like, and make the display device 30 output the video and/or sound with which only a user identifier of the identified other user is associated.

When the state identification unit 26 has identified that the HMD 40 is in the state of being detached from the user, the output control unit 27 limits the output to the display device 30 of the video and/or the sound for the user different from the user wearing the HMD 40. For example, the output control unit 27 limits the output to the display device 30 of the video and/or the sound with which a user identifier of the identified user is not associated. Alternatively, the output control unit 27 limits the output to the display device 30 of the video and/or the sound with which only a user identifier of other user not wearing the HMD 40 is associated.

As described above, by identifying the user who is wearing the HMD 40, a video and sound that the user wearing the HMD 40 should not view or listen to while the user is wearing the HMD 40 can be output from the display device 30.

Figure 10:
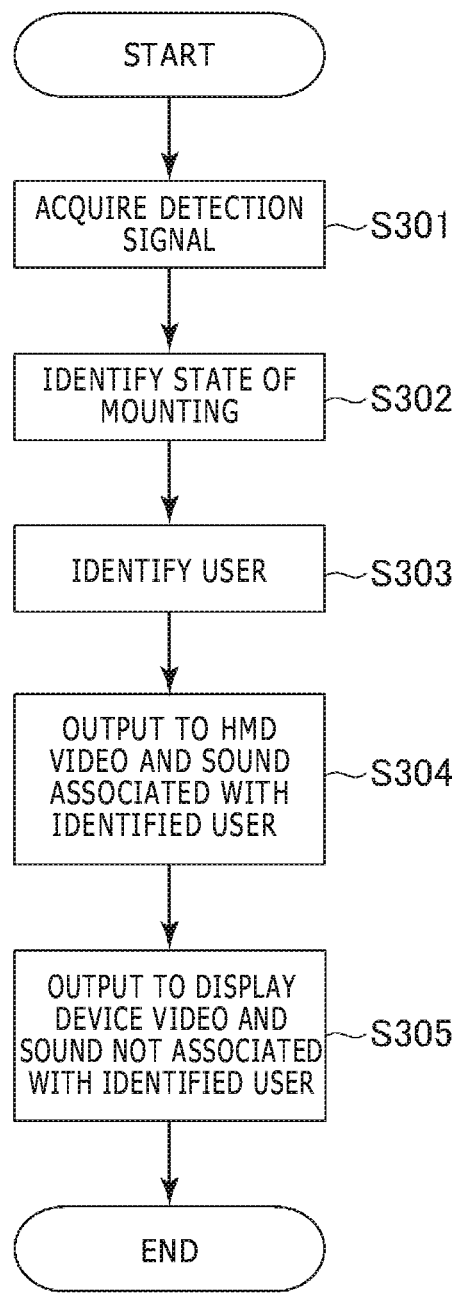
FIG. 10 is a flowchart depicting an example of an output control process of the display device when the user wears the HMD performed by the control device according to the second embodiment.

Next, an example of an output control process of the display device 30 when the user detaches the HMD 40, performed by the control device 20 according to the second embodiment, will be described, with reference to a flowchart of FIG. 10.

First, when the user A wears the HMD 40 in the state that the user A and the user B are utilizing together the display device 30 as depicted in FIG. 9A, a detection signal detected by the sensor unit 46 of the HMD 40 and an image of the user captured by the sensor unit 46 are transmitted to the control device 20.

The state identification unit 26 of the control device 20 acquires the detection signal and the face image of the user transmitted from the HMD 40 (S301). Then, the state identification unit 26 of the control device 20 identifies the state of the HMD 40, based on the acquired detection signal (S302), and identifies the user, based on the acquired face image of the user (S303). In this case, the state identification unit 26 of the control device 20 identifies that the HMD 40 is in the state of being mounted on the user, based on the detection signal indicating the detection of the user. The state identification unit 26 of the control device 20 identifies the user (the user A, in this case) wearing the HMD 40, by collating the feature information of a user registered in advance with the feature information extracted from the acquired face image of the user.

The output control unit 27 of the control device 20 outputs to the HMD 40 the video and the sound which are associated with a user identifier of the user identified in process S303 by the state identification unit 26 of the control device 20 (S304). Subsequently, the output control unit 27 of the control device 20 outputs to the display device 30 the video and the sound which are not associated with a user identifier of the user identified in process S303 by the state identification unit 26 of the control device 20 (S305). Then, the process ends.

In this case, as depicted in FIG. 9B, for example, the user A is wearing the HMD 40, and the user B not wearing the HMD 40 becomes in the state of utilizing the display device 30. In this case, the display device 30 displays the video not displayed in the state that the user A and the user B are not utilizing together the display device 30 (in this case, the user target video 300) as depicted in FIG. 9A. That is, when the user A wears the HMD 40, the user target video 300 for the user B, and not for the user A to view, is displayed on the first display unit 34 of the display device 30.

Next, an example of an output control process of the display device 30 when the user detaches the HMD 40, performed by the control device 20 according to the second embodiment, will be described, with reference to a flowchart of FIG. 11.

First, when the user A detaches the HMD 40 in the state that the user A is wearing the HMD 40 and the user B not wearing the HMD 40 is utilizing the display device 30 as depicted in FIG. 9B, a detection signal detected by the sensor unit 46 of the HMD 40 is transmitted to the control device 20.

The state identification unit 26 of the control device 20 acquires a detection signal transmitted from the HMD 40 (S401). Then, the state identification unit 26 of the control device 20 identifies the state of the HMD 40 from the acquired detection signal (S402). In this case, the state identification unit 26 of the control device 20 identifies that the HMD 40 is in the state of being detached from the user, based on the detection signal indicating that a user is not detected.

Because the state identification unit 26 of the control device 20 has identified in process S402 that the HMD 40 is in the state of being detached from the user, the output control unit 27 of the control device 20 outputs to the display device 30 the video and the sound associated with all users (in this case, the user A and the user B) (S403). The output control unit 27 of the control device 20 limits the output from the HMD 40 (S404), and the process ends. In this case, as depicted in FIG. 9A, the user A and the user B become in the state of performing together the game by using the display device 30. The game video is displayed on the first display unit 34 of the display device 30, but the user target video 300 is not displayed.

The present invention is not limited to the embodiments described above.

For example, the state identification unit 26 may be included in the entertainment device 10. In this case, a detection signal detected by the sensor unit 46 of the HMD 40 may be transmitted to the entertainment device 10 via the control device 20. The state of the HMD 40 may be identified in accordance with the detection signal received by the entertainment device 10. Then, a signal that indicates the state of the HMD 40 identified by the entertainment device 10 may be transmitted to the control device 20. The control device 20 may control the output from the display device 30 and the HMD 40 in accordance with the state of the HMD 40.

Further, the state identification unit 26 may be included in the HMD 40. In this case, the HMD 40 may identify the state of the HMD 40 in accordance with a detection signal detected by the sensor unit 46. Then, a signal that indicates the state of the HMD 40 identified by the HMD 40 may be transmitted to the control device 20. The control device 20 may control the output from the display device 30 and the HMD 40 in accordance with the state of the HMD 40.

In the above embodiments, an example that the control device 20 and the entertainment device 10 are separate bodies is described. Alternatively, the control device 20 and the entertainment device 10 may be an integral device. For example, it may be arranged such that when the control device 20 is included in the entertainment device 10, the detection signal detected by the sensor unit 46 of the HMD 40 is transmitted to the entertainment device 10 and that the entertainment device 10 identifies the state of the HMD 40 in accordance with the detection signal received. Then, the entertainment device 10 may control the output from the display device 30 and the HMD 40 in accordance with the state of the HMD 40.

In the above embodiments, although an example that one HMD 40 is included in the video display system is described, a plurality of the HMDs 40 may be included. In this case, the control device 20 is assumed to be connectable to the plurality of HMDs 40.

The invention claimed is:

1. A control device comprising:
   an identification unit configured to identify wearing and detachment of a head-mounted display;
   a user identification unit configured to identify a user who wears the head-mounted display; and
   an output control unit configured to control, in accordance with the wearing or detachment, at least one output of sound output and video output from a display device which is provided separately from the head-mounted display, wherein when the user detaches the head-mounted display while performing a game being output by the head-mounted display, the output control unit causes at least one of game video and sound output by the head-mounted display to cease or be limited, and causes the at least one of game video and sound to be output by the display device provided separately from the head-mounted display.

2. The control device according to claim 1, wherein the output control unit limits at least one of the sound output and the video output that is output in accordance with the detachment of the head-mounted display.

3. The control device according to claim 1, wherein when the user puts on the head-mounted display while game video and sound are output to the separately provided display device, the output control unit causes the at least one of game video and sound to be output by the head-mounted display, allowing the user to perform the rest of the game with the head-mounted display, and causes the at least one of game video and sound output by the separately provided display device to cease or be limited.

4. A control method comprising:

identifying wearing or detachment of a head-mounted display;

identifying a user who wears the head-mounted display; and controlling, in accordance with the wearing or detachment, at least one output of sound output and video output from a display device which is provided separately from the head-mounted display, wherein when the user detaches the head-mounted display while performing a game being output by the head-mounted display, the output control unit causes at least one of game video and sound output by the head-mounted display to cease or be limited, and causes the at least one of game video and sound to be output by the display device provided separately from the head-mounted display.

5. The control method according to claim 4, wherein the output controlling limits at least one of the sound output and the video output that is output in accordance with the detachment of the head-mounted display.

* * * * *